United States Patent
Excoffier et al.

(10) Patent No.: US 7,194,472 B2
(45) Date of Patent: Mar. 20, 2007

(54) EXTENDING ROLE SCOPE IN A DIRECTORY SERVER SYSTEM

(75) Inventors: Karine Excoffier, Montbonnot (FR); Robert Byrne, Voiron (FR)

(73) Assignee: Sun Microsystems Inc., Santa Clara, CA (US)

( * ) Notice: Subject to any disclaimer, the term of this patent is extended or adjusted under 35 U.S.C. 154(b) by 497 days.

(21) Appl. No.: 10/613,660

(22) Filed: Jul. 2, 2003

(65) Prior Publication Data

US 2004/0078391 A1 Apr. 22, 2004

(30) Foreign Application Priority Data

Jul. 5, 2002 (FR) .................... 02 08491

(51) Int. Cl.
- G06F 7/00 (2006.01)
- G06F 17/30 (2006.01)
- G06F 12/00 (2006.01)

(52) U.S. Cl. .............. 707/100; 707/1; 707/3; 707/200; 707/203

(58) Field of Classification Search .............. 707/1, 707/3, 100, 200, 203

See application file for complete search history.

(56) References Cited

U.S. PATENT DOCUMENTS 6,768,988 B2 *  7/2004  Boreham et al. .............. 707/3

OTHER PUBLICATIONS

Abbey et al., Ganymede: An Extensible and Customizable Directory Management Framework, 1998 Lisa XII, Dec. 6-11, Boston MA, pp. 197-218.*
Barkley et al., Managing Role/Permission Relationships Using Object Access Types, $3^{rd}$ ACM Workshop on Role-Based Access, Fairfax, VA 1998, pp. 73-80.*
Lupu et al., Reconciling Role Based Management and Role Based Access Control, RBAC '97 Fairfax, VA, pp. 135-141.*
Yialelis et al., Role-Based Security for Distributed Object Systems, Proceedings of WET ICE '96, IEEE, pp. 80-85.*

* cited by examiner

Primary Examiner—Tim Vo
Assistant Examiner—Cheyne D. Ly
(74) Attorney, Agent, or Firm—Osha Liang LLP

(57) ABSTRACT

Extending role scope in a directory server system. A directory server system comprises a directory server and a role mechanism. The directory server interacts with entries organized in a tree structure. The entries comprise user entries and role entries. The role entries define a role and have an associated scope defined from their location in the tree structure. The role mechanism is capable of attaching a role of an existing role entry to a user entry subject to a first condition comprising. The role mechanism is further capable of determining whether the existing role entry has extra data designating an extra scope, and, if so, of attaching a role of the existing role entry to a user entry subject to a second condition. The second condition comprises the role membership condition and the fact that the user entry belongs to the extra scope of the existing role entry.

39 Claims, 18 Drawing Sheets

ENTRY
404

ATTRIBUTE TYPE
400

ATTRIBUTE VALUE
402

| | |
|---|---|
| dn : | uid=Joe, ou=people, dc=france, dc=sun, dc=com |
| objectClass : | top |
| objectClass : | person |
| objectClass : | organizationlPerson |
| objectClass : | inetOrgPerson |
| cn : | Joe |
| sn : | Rayan |
| uid : | joerayan |
| mail : | joerayan@sun.com |
| phoneNumber : | 778 |

**FIGURE 5
(PRIOR ART)**

| ROLE TYPE | OBJECT CLASSES 71 | ATTRIBUTES 72 |
|---|---|---|
| MANAGED ROLE 701 | nsSimpleRoleDefinition nsManagedRoleDefinition | description (optional) |
| FILTERED ROLE 702 | nsComplexRoleDefinition nsFilteredRoleDefinition | NsRoleDN description (optional) |
| NESTED ROLE 703 | nsComplexRoleDefinition nsNestedRoleDefinition | NsRoleDN description (optional) |

FIGURE 7 (PRIOR ART)

| ATTRIBUTES | ATTRIBUTE VALUES |
|---|---|
| *dn* | DISTINGUISHED NAME OF THE NESTED ROLE |
| *objectclass* | OBJECT CLASSES OF THE NESTED ROLE |
| *nsRoleScopeDn* | DISTINGUISHED NAME OF THE EXTENDED SCOPE |
| *nsRoleDn* | DISTINGUISHED NAMES OF THE ROLES CONTAINED BY THE NESTED ROLE |

FIGURE 11

| ROLE DN<br>L221 | ROLE TYPE<br>L222 | SCOPE EXTENSION DN<br>L223 | AVL TREE<br>L224 |

| cn = staff, o = suffix2<br>L221.2 | MANAGED<br>L222.2 |

| cn = staff, o = suffix1<br>L221.3 | MANAGED<br>L222.3 |

EXTENDING ROLE SCOPE IN A DIRECTORY SERVER SYSTEM

RELATED APPLICATION

This Application claims priority to French Patent Application, Number 0208491, filed on Jul. 5, 2002, in the name of SUN Microsystems, Inc., which application is hereby incorporated by reference.

A portion of the disclosure of this patent document contains material which may be subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates to the field of distributed computer systems. Specifically, embodiments of the present invention relate extending the scope of a role in a directory server system.

2. Background Art

In certain fields of technology, complete computer systems, including a diversity of equipment, are optimized for storing and retrieving data. Such systems may provide services to user machines related to a local network, e.g., an Intranet, or to a global network, e.g., the Web network.

It is desirable that network users can access, upon a query, a large number of data, making it possible for the network users to create their own dynamic web site or to consult a dynamic web site, for example an e-commerce site on a multi platform computer system (Solaris™, Windows NT™.). These queries are directed to a directory, e.g., an LDAP directory, and managed by a directory server. It is further desirable that this access to a large number of data be made possible more rapidly for each query arriving after a first query.

SUMMARY OF THE INVENTION

The present invention provides a method and system for extending role scope in a directory server system. In one embodiment, a directory server system comprises a directory server and a role mechanism. The directory server interacts with entries organized in a tree structure. The entries comprise user entries and role entries. The role entries define a role and have an associated scope in the tree structure. The scope is defined from the location of the role entries in the tree structure, according to a predefined rule. The role mechanism is capable of attaching a role of an existing role entry to a user entry subject to a first condition. The first condition comprises a role membership condition and the user entry belonging to the scope of the existing role entry. The role mechanism is further capable of determining whether the existing role entry has extra data designating an extra scope, and, if so, of attaching a role of the existing role entry to a user entry subject to a second condition. The second condition comprises the role membership condition and the user entry belonging to the extra scope of the existing role entry.

Another embodiment is a method of operating a directory server system. In the method, the directory server interacts with entries organized in a tree structure, in which the entries comprise user entries and role entries. Each role entry defines a role and has an associated scope in the tree. The scope is defined from the location of the role entry in the tree, according to a predefined rule. The role of an existing role entry is attached to a user entry subject to a first condition, which comprises a role membership condition and the fact that the user entry belongs to the scope of the existing role entry. The method comprises adding extra role data to the existing role entry, the extra data identifying an extra scope in the tree for the existing role entry. The method further comprises attaching the role of the existing role entry to a user entry subject to a second condition comprising the role membership condition and the user entry belonging to the extra scope of the existing role entry.

Embodiments of the present invention provide these advantages and others not specifically mentioned above but described in the sections to follow.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 5 represents attribute types and values of an entry.

FIG. 7 is a table showing three types of LDAP roles according to the prior art.

FIG. 11 is a table, showing syntax of an extended role, in accordance with an embodiment of the invention.

DETAILED DESCRIPTION OF THE INVENTION

In the following detailed description of the present invention, extending role scope in a directory server system, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Embodiments of the present invention may be defined as an apparatus or system, and/or as software code for implementing the method, or for use in the system, and/or as portions of such software code, in all their alternative embodiments to be described hereinafter.

Making reference to software entities imposes certain conventions in notation. Particularly, an expression indicated between the quote signs " " may be used to design LDIF extracts and an expression in italics may be used for representing an attribute and an object class.

As they may be cited in this specification, Sun™, Sun Microsystems™ and Sun One™ are trademarks of Sun Microsystems, Inc.

Figure 1:
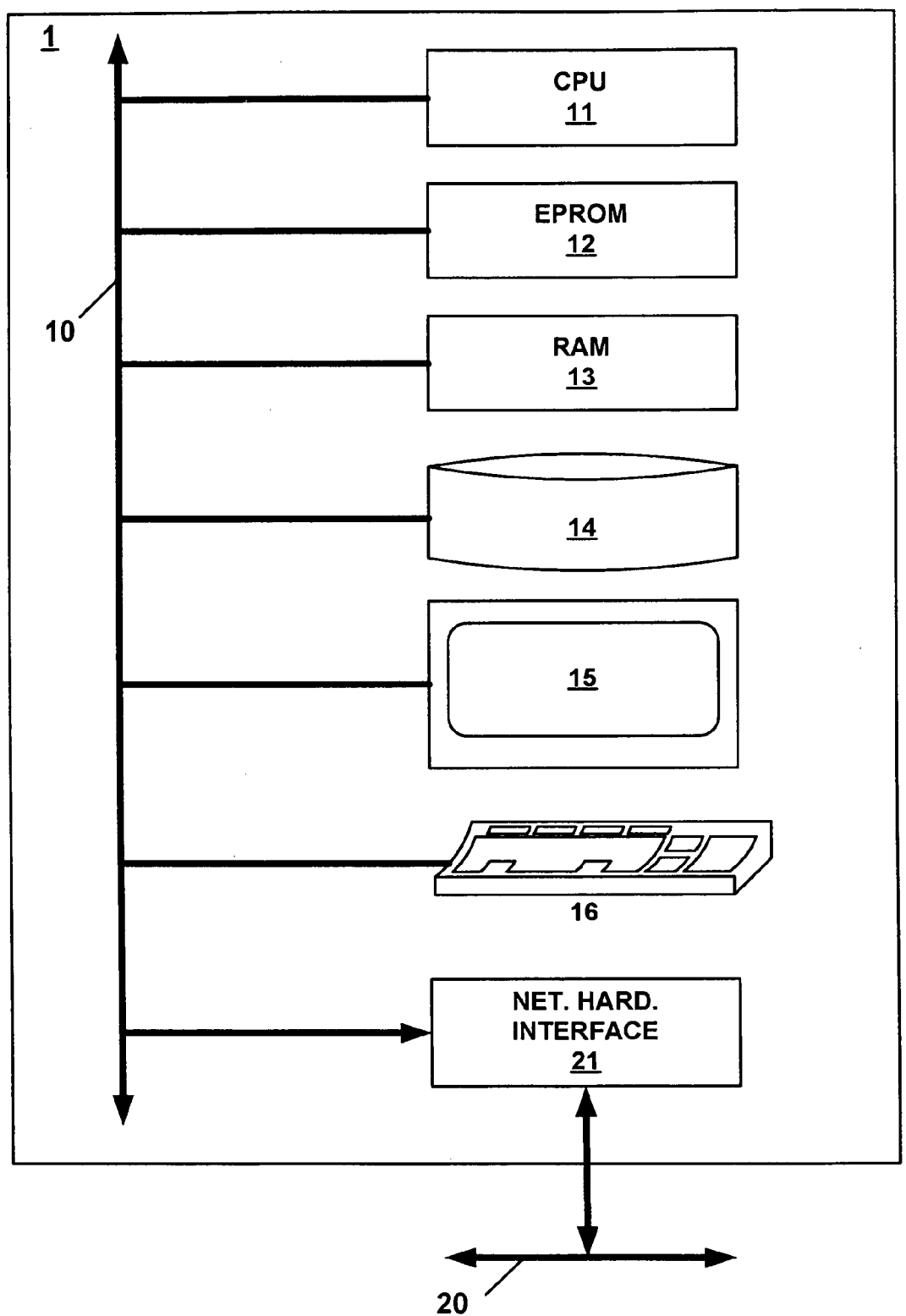
FIG. 1 is a general diagram of a computer system in which embodiments of the invention are applicable.

This invention may be implemented in a computer system, or in a network comprising computer systems. FIG. 1 represents an example of the hardware of such computer systems. The hardware comprises:
a processor CPU 11, e.g., an Ultra-Sparc;
a program memory 12, e.g., an EPROM, a RAM, or Flash memory;
a working memory 13, e.g., a RAM of any suitable technology;
a mass memory 14, e.g., one or more hard disks;
a display 15, e.g., a monitor;
a user input device 16, e.g., a keyboard and/or a mouse;
a network interface device 21 connected to a communication medium 20, which is in communication with other computers. Network interface device 21 may be of the type of Ethernet, or of the type of ATM. Medium 20 may be based on wire cables, fiber optics, or radio-communications, for example.

Data may be exchanged between the components of FIG. 1 through a bus system 10, represented as a single bus for simplification of the drawing. Bus systems may include a processor bus, e.g., PCI, connected via appropriate bridges to, e.g., an ISA or an SCSI bus.

The data exchanged are handled by a resource provider using a server to deliver data to user computers, or to store the data provided by the user computers. Browsers, e.g., Internet Explorer™, are further provided on user computers, to enable users, to make requests to retrieve or store data. The resource provider makes it possible for user computers on a network to share data of any kind.

iPlanet E-commerce Solutions, now Sun One™ E-commerce Solutions, has developed a "net-enabling" platform called the Internet Service Deployment Platform (ISDP). ISDP includes multiple, integrated layers of software that provide a full set of services supporting application development, e.g., business-to-business exchanges, communications and entertainment vehicles, and retail Web sites.

Sun One™ Directory Server provides a centralized directory service directory service for an intranet or an extranet. A directory service represents a collection of software, hardware, and processes that are able to deliver and store information. The directory service generally includes one or more directory client programs that can access the data stored in the directory, e.g., names, telephone numbers, or addresses.

The Sun One™ Directory Server is a general-purpose directory that stores all information in a single, network-accessible repository. The Sun One™ Directory Server provides the standard protocol LDAP and an application programming interface (API) to access the information contained by the Sun One™ Directory Server.

LDAP is the Internet standard for directory lookups, just as the Simple Mail Transfer Protocol (SMTP) is the Internet Standard for delivering e-mail and the Hypertext Transfer Protocol (HTTP) is the Internet standard for delivering documents. Technically, LDAP is defined as on-the-wire bit protocol (similar to HTTP) that runs over Transmission Control Protocol/Internet Protocol (TCP/IP). It specifies the interaction between clients and servers and determines how LDAP queries and responses are carried over the IP network.

An LDAP-compliant directory, such as the Sun One™ Directory Server, leverages a single, master directory that contains all users, groups and access information. The directory is hierarchical, not relational and is particularly fitted for reading while offering a high reliability and a high scalability.

For example, the directory can be used to provide information technology managers with a list of all the hardware and software assets in a widely spanning enterprise. Most importantly, a directory server provides resources that all applications can use, and aids in the integration of these applications that have previously functioned as stand-alone systems. Instead of creating an account for each user in each system the user needs to access, a single directory entry is created for the user in the LDAP directory.

Figure 2:
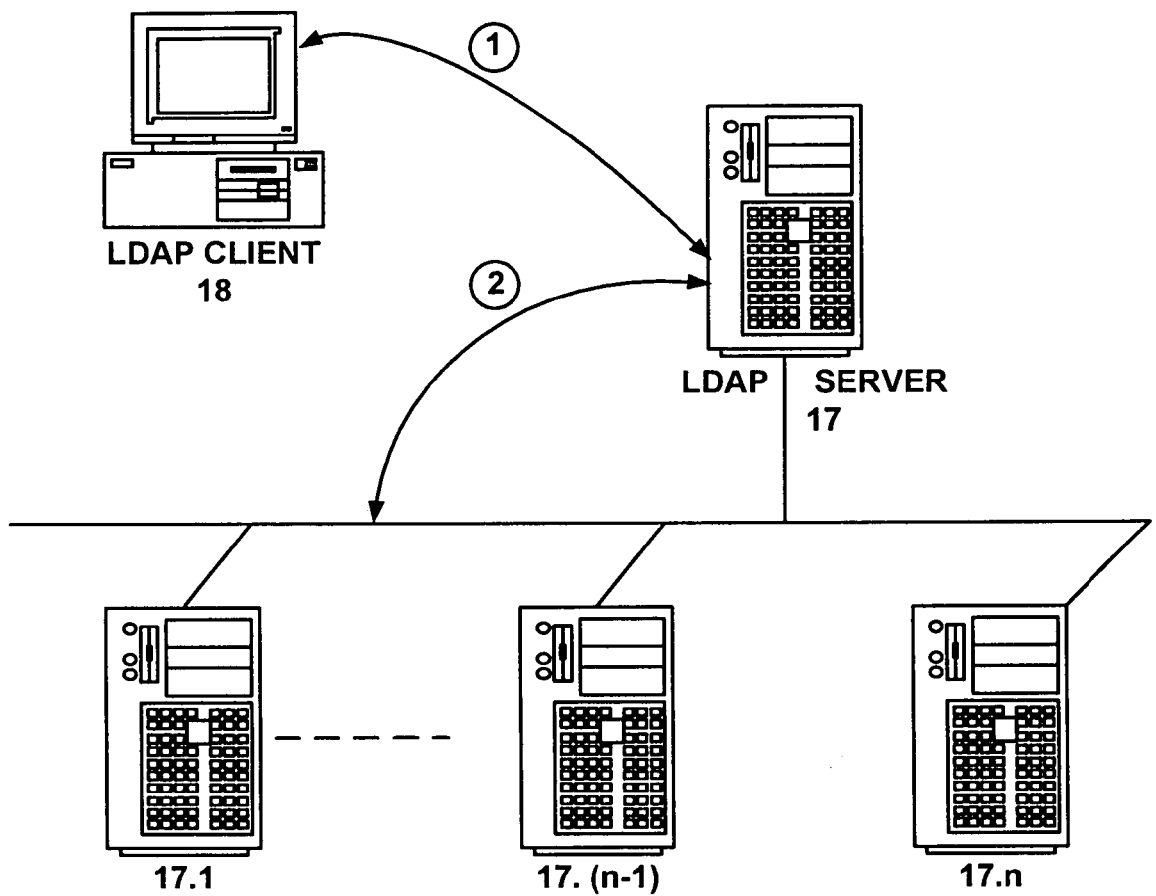
FIG. 2 illustrates a typical LDAP exchange between an LDAP client and an LDAP server, and between the LDAP server and additional servers.

Referring now to FIG. 2, LDAP defines a communication 1 between a server 17 and a client 18. LDAP also defines a communication 2 between LDAP server 17 and servers 17.1 to 17.n, which makes it possible for the server LDAP 17 to exchange its content (replication service) with servers 17.1 to 17.n or to access the directory of one of the servers 17.1 to 17.n (referral service) and vice versa.

The LDAP protocol is a message-oriented protocol. The client 18 constructs an LDAP message containing a request and sends the message to the server 17. The server 17 processes the request and sends a result, or results, back to the client 18 as a series of LDAP messages.

Such a client-server communication additionally lies on a specific architecture. LDAP creates a standard defining the way data are exchanged between the client computer and the directory server and defining the way data are modeled. More specifically, LDAP relies on four basic models:
an information model;
a naming model;
a functional model; and
a security model.

The LDAP information model defines the kind of data that can be stored in a directory. LDAP directory is populated with entries. An entry corresponds to real-world objects, such as a person, a printer, or configuration parameters.

Figure 3:
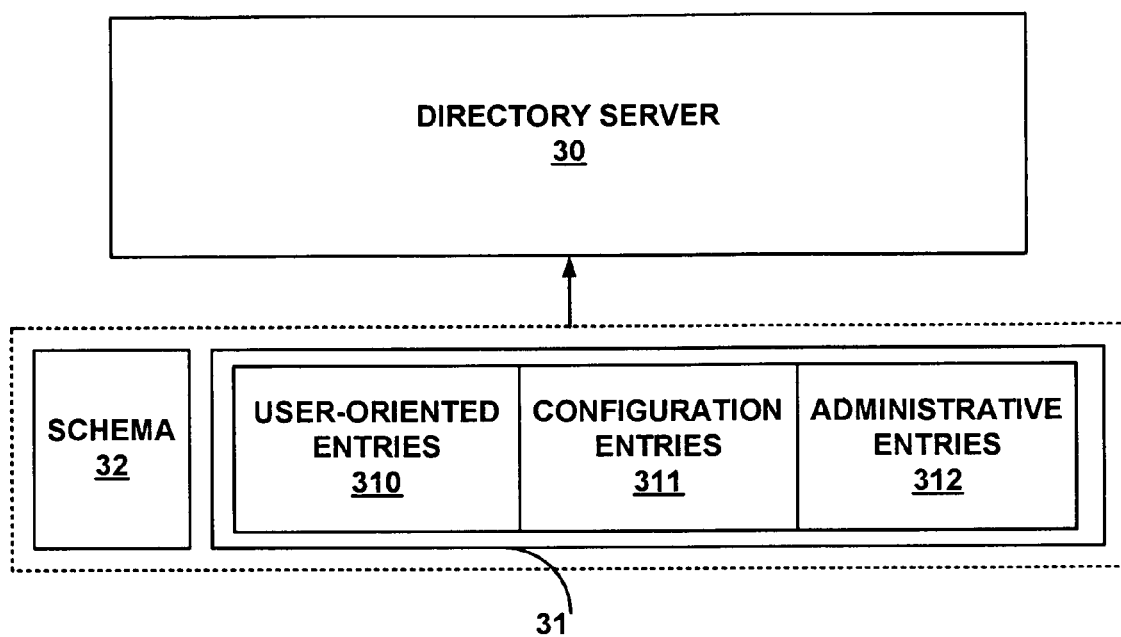
FIG. 3 represents the general structure of an LDAP directory.

FIG. 3 illustrates the general structure of an LDAP directory: the directory server 30 executes implemented functions based on the entries 31 stored in databases. The entries comprise configuration entries 310, user entries 311 and administrative entries 312. These entries further interact with the schema 32 which is described below.

The configuration entries are stored under a subtree "cn=config". The user entries comprise data related to the users of the directory server. Administrative entries relate to user management and are generally implemented as LDAP subentries.

An entry contains a set of attributes associated with values (e.g., common name cn or surname sn). Each entry is uniquely identified by a distinguished name DN. This distinguished name may be stored in the attribute dn (distinguishedName) of each entry.

Figure 4:
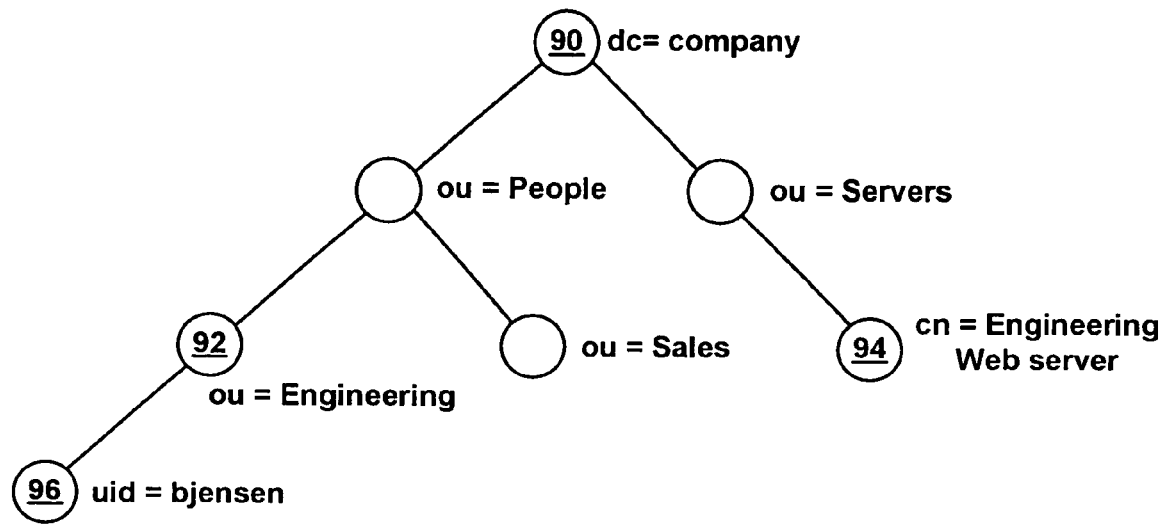
FIG. 4 shows an exemplary portion of an LDAP tree.

LDAP entries are organized in a hierarchical tree structure, called the Directory Information Tree (DIT). Each node of the tree comprises an entry. FIG. 4 illustrates an organization entry (90) with the attribute type of domain component dc, an organizational unit entry (92) with the attribute type of organizational unit ou, a server application entry (94) with the attribute type of common name cn, and a person entry (96) with the attribute type of user IDuid. The entries are connected by the directory. Each server has a particular entry called root directory specific entry (rootDSE) which contains the description of the tree and of its content.

AN LDAP Data Interchange Format (LDIF) is an ASCII text file format used to describe directory entries and operations on those entries. It enables to create, modify, and delete Directory entries and to import and export data among LDAP directories. FIG. 5 is a LDIF representation of an entry 404, showing the attribute types 400 and their values 402.

The information model is extensible, which means that new types of information can be added to an LDAP directory.

Descriptive information is stored in the attributes of the entry. Each attribute describes a specific type of information. Attributes may have constraints that limit the type and length of data placed in attribute values.

All entries require the objectclass attribute which lists the object classes to which an entry belongs. An entry can belong to one or more object classes and must satisfy all of them. The objectclass attribute defines which attributes are required and which attributes are allowed in the entry.

For example, in FIG. 5, the entry (404) represented in LDIF belongs to the object classes top, person, organizationalPerson and inetOrgPerson.

Each attribute has a corresponding syntax definition. The syntax definition describes the type of information provided by the attribute. The object classes, the required and allowed attributes, and the syntax definition of the attributes are listed in the directory schema.

The LDAP directory comprises a structure 32, represented in FIG. 3, that defines object classes and attributes, and may be viewed as metadata. This structure, called the schema 32, sets the rules defining what information can be stored in the LDAP directory and how information is organized. The schema 32 specifies the required and allowed attributes that are used to store information and their syntax definition. A schema checking function may be activated, thus causing the directory server to check new entries to verify whether:

object classes and attributes attached to new entries are defined in the schema 32, the attributes required for an object class according to the schema 32, are contained in an entry attached to that object class, only attributes allowed by the object class according to the schema 32, are contained in an entry attached to that object class.

The LDAP naming model specifies that directory entries must be hierarchical and organized in an inverted tree structure. As mentioned above, each entry has a unique name called a distinguished name dn. The dn consists of a list of the names of all the parent entries in the directory back to the top of the directory hierarchy, the name of the entry being at the extreme left, e.g., "uid=Joe,ou=people, dc=france,dc=sun,dc=com", in FIG. 5. The root of the entry is at the extreme right of the dn. The name at the extreme left of the dn, "uid=Joe" in the example, is the relative distinguished name or rdn. Within a set of entries sharing the same parents, the rdn must be unique. This ensures that two entries in the directory tree cannot have the same dn.

The LDAP functional model comprises eight basic functional operations (indicated thereinafter between the quote signs " ") that a user from a client computer can perform on the directory data of an LDAP directory server:

"bind" and "unbind": begin and end the exchange of information between LDAP clients and the directory server;

"add", "delete", and "modify": apply on specific entries in the DIT,

"compare": applies on two entries to compare their content according to criteria, "search": locates specific entries in the DIT, "modifyRDN": applies to change the distinguished name dn of an entry.

In addition to the eight basic functional operations, the LDAP protocol defines a framework for adding new operations to the protocol via LDAP extended operations. Extended operations allow the protocol to be extended in an orderly manner to meet new marketplace needs as they emerge.

According to another aspect of LDAP directories, entry grouping mechanisms are provided to simplify the management of LDAP users. Roles, introduced in version 5 of iDS, constitute an LDAP grouping mechanism.

A role may have members, which are the entries said to possess the role. The role mechanism enables the following operations:

enumerating the members of a given role, determining whether a given entry possesses a particular role, enumerating all the roles possessed by a given entry, Additionally, it is possible to assign a particular role to a given entry and to revoke a particular role from a given entry.

Figure 6:
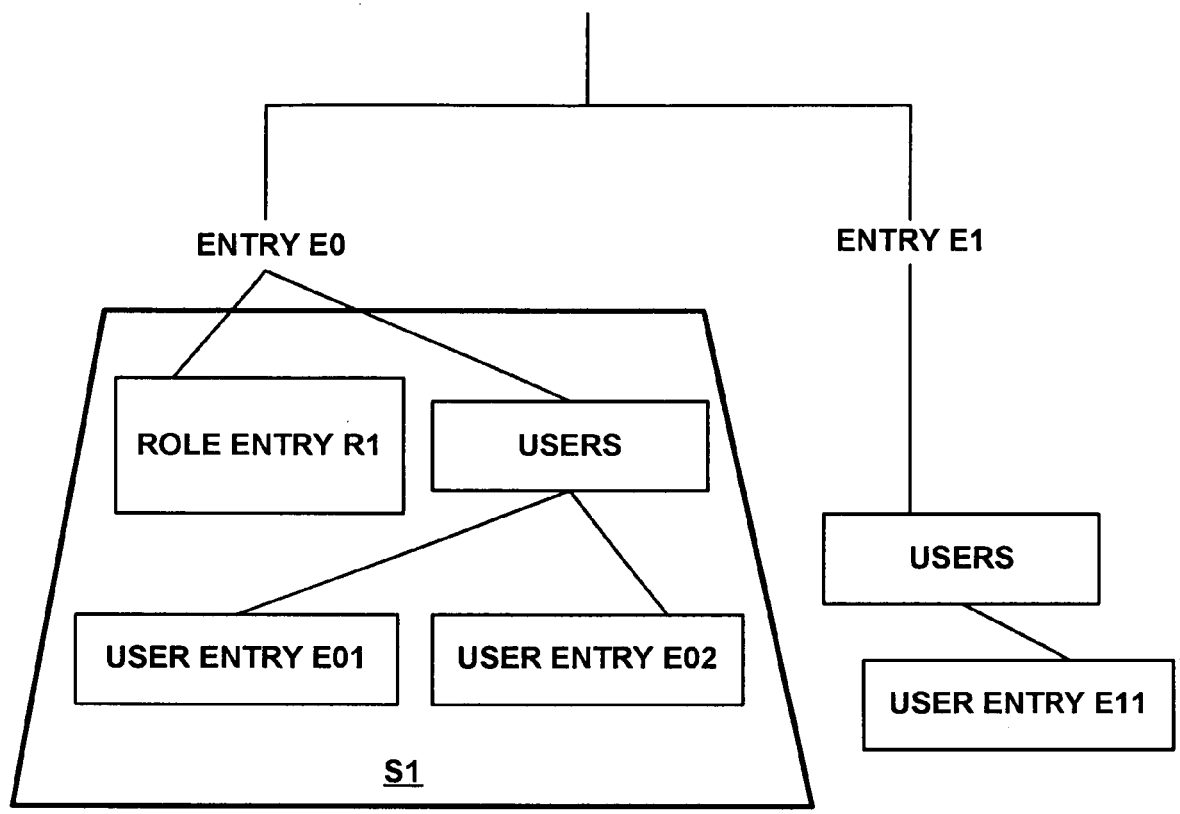
FIG. 6 is a portion of an LDAP tree showing the scope of a role, according to the prior art.

Every role is defined by its own definition entry. A role is uniquely identified by the distinguished name of its definition entry. Role definition entries are LDAP subentries and therefore inherit the subentry mechanism, defined in the ISO/IEC X.509 standard, for scope. The scope of a role corresponds to the subtree of the role parent entry as illustrated by FIG. 6. User entries E01 and E02 are in the scope S1 of the role R1 while user entry E11 is out of the scope of the role R1. Thus, user entries E01 and E02 are likely to be members of role R1 while user entry E11 cannot be a member of role R1.

Referring to FIG. 7, a role can be of "managed" type 701, "filtered" type 702 or "nested" type 703. Each type of role further has two specific object classes 71 that inherit from the nsRoleDefinition object class, and is related to specific attributes 72 (nsRoleDN, nsRoleFilter.

On creating a role, members may be assigned to the role as follows:

members of a managed role have the nsRoleDN attribute in their entry, members of a filtered role are entries that match the filter specified in the nsRoleFilter attribute of the role definition entry, members of a nested role are members of the roles specified in the nsRoleDN attributes of the nested role definition entry.

Managed roles belong to the nsSimpleRoleDefinition object class and are thus simple roles. Filtered and nested roles belong to the nsComplexRoleDefinition object class are thus complex roles.

Tables I–III respectively represent a managed role, a filtered role and a nested role, in LDIF, according to the prior art.

TABLE I

```
dn: cn = Marketing, ou = people, dc = example, dc = com
objectclass: top
objectclass: LDAPsubentry
objectclass: nsRoleDefinition
objectclass: nsSimpleRoleDefinition
objectclass: nsComplexRoleDefinition
cn: Marketing
description: managed role for marketing staff
```

TABLE II

```
dn: cn = SalesFilter, ou = people, dc = example, dc = com
objectclass: top
objectclass: LDAPsubentry
objectclass: nsRoleDefinition
objectclass: nsComplexRoleDefinition
objectclass: nsFilteredRoleDefinition
cn: SalesFilter
leFilter: description = marketing guy
description: filtered role for sales staff
```

TABLE III

```
dn: cn = MarketingSales, ou = people, dc = example, dc = com
objectclass: top
objectclass: LDAPsubentry
objectclass: nsRoleDefinition
objectclass: nsComplexRoleDefinition
objectclass: nsNestedRoleDefinition
cn: MarketingSales
nsRoleDN: cn = Marketing, ou = people, dc = example, dc = com
nsRoleDN: cn = SalesFilter, ou = people, dc = example, dc = com
description: nested role for marketing and sales staff
```

Table IV represents a user entry member of the managed role of Table I. Table V rep[resents a user entry member of the filtered role of Table II.

TABLE IV

```
dn: cn = Joe, ou = people, dc = example, dc = com
objectclass: person
cn: Joe
sn: Bradford
userpassword: joepasswd
nsRoleDN: cn = Marketing, ou = people, dc = example, dc = com
```

TABLE V

```
dn: cn = Richard, ou = people, dc = example, dc = com
objectclass: person
cn: Richard
sn: Parker
userpassword: richardpasswd
description: marketing guy
```

Figure 8A:
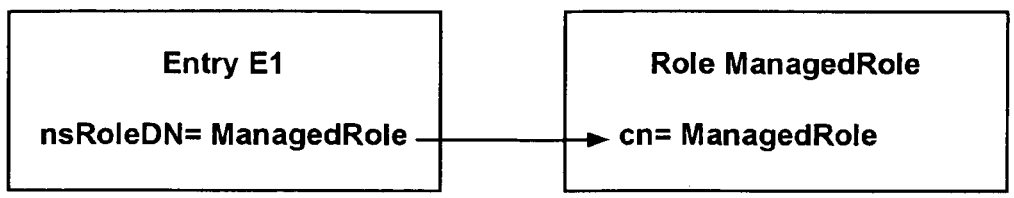
FIGS. 8a to 8c represent the structure of the three types of roles shown in FIG. 7.
Figure 8B:
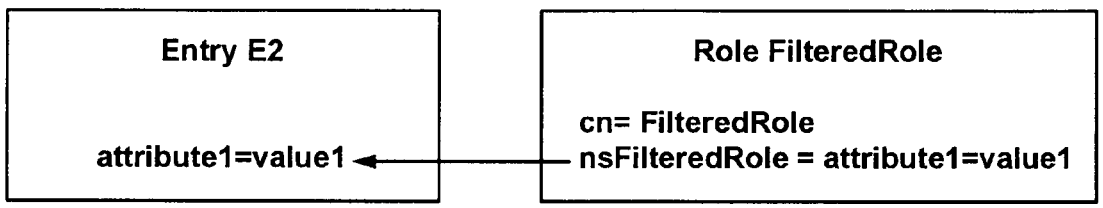
Figure 8C:
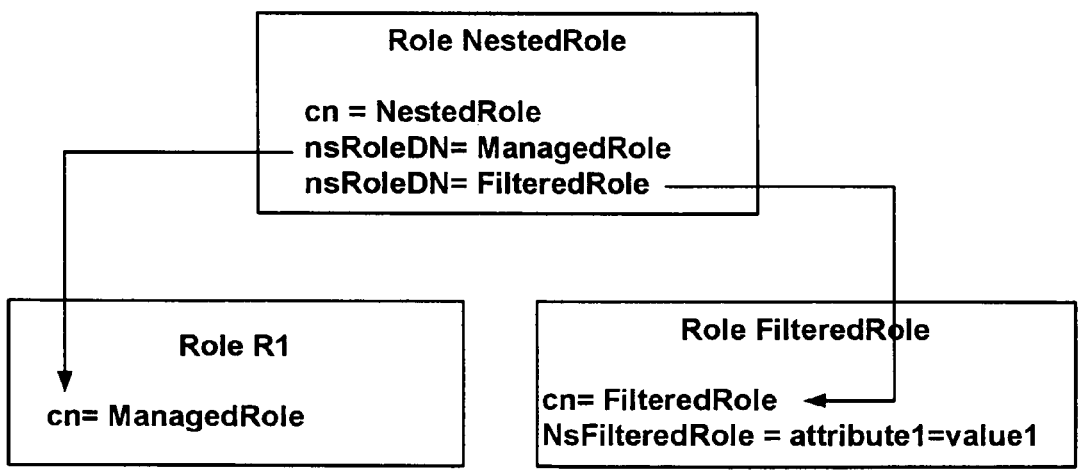

FIGS. 8a, 8b and 8c respectively illustrate a managed role, filtered or nested role. As represented in FIG. 8a, nsRoleDN relates a user Entry E1 to a managed role (ManagedRole), thus indicating that the entry is a member of that role. FIG. 8b shows that nsRoleFilter relates a filtered role (FilteredRole) to a user entry E2, thus indicating that entry E2 is a member of that role. nsRoleDN can also be a pointer from a nested role to another role (ManagedRole, FilteredRole) as shown in FIG. 8c.

LDAP servers use a computed attribute called nsrole to determine the roles possessed by a given entry. The nsrole attribute is a computed attribute and, as a result, it is not stored in the entry itself. This attribute is computed for each of the three types of role operations identified above.

Figure 9:
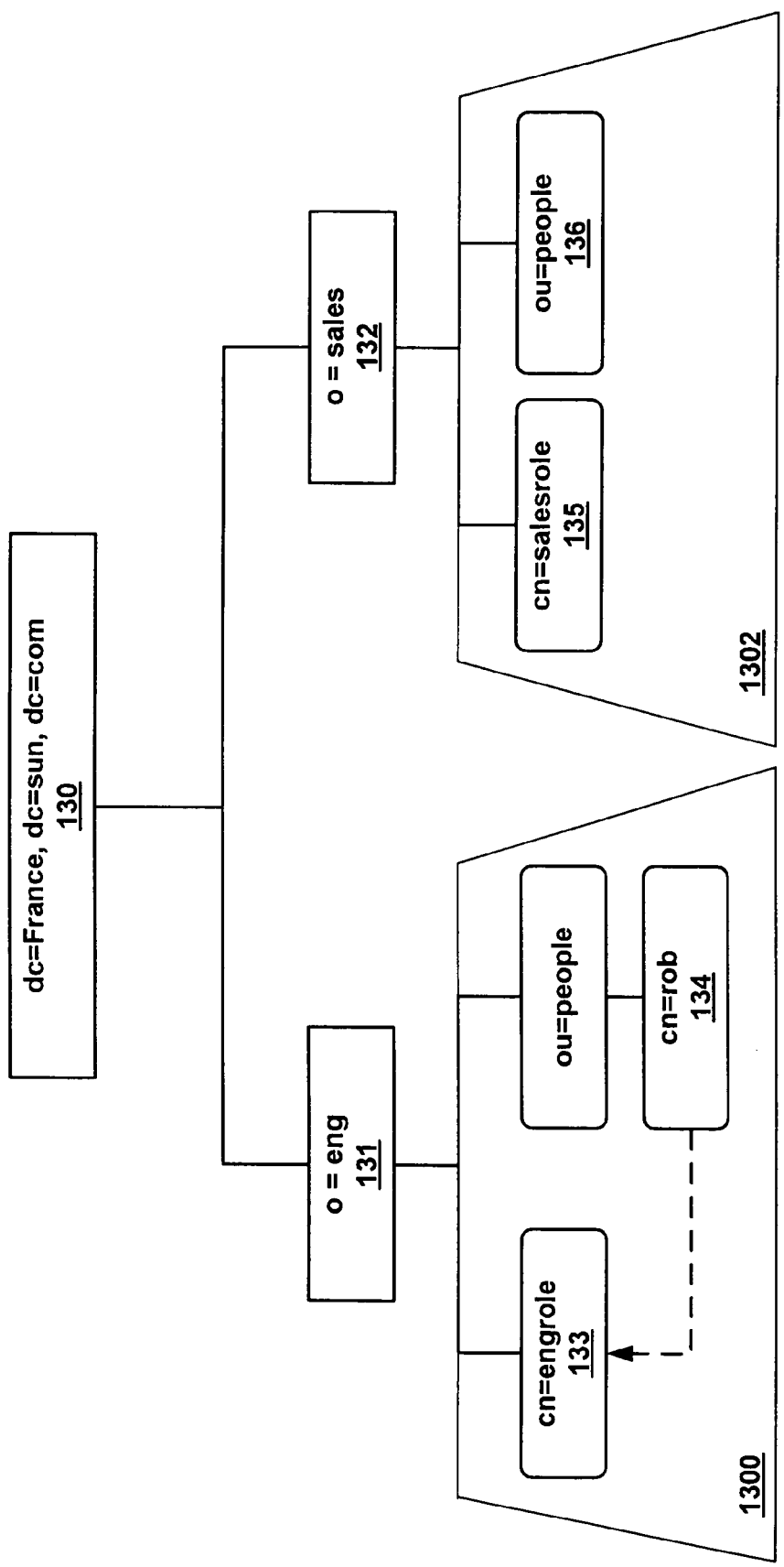
FIG. 9 shows a portion of an LDAP tree structure, according to the prior art.

In FIG. 9, a user 134 identified by the RDN "cn=rob" in the engineering division 131 ("o=eng") is a member of the engineering role 133 ("cn=engrole"). He has the permissions associated with that role. However, he may need to access a resource, e.g., an application, requiring the permissions associated with sales role 135 ("cn=salesrole") defined for the sales division 132 "o=sales". In other words, this implies that the user "cn=rob" needs to be added as a member of the sales role 135, while remaining a member of the engineering role 133.

As the scope of the sales role 135 is defined by the subtree 1302, a solution of the prior art is to add an additional entry "cn=rob", having an attribute "nsRoleDN=salerole" as a subentry of the entry 136 "ou=people" of sales division 132. However, this solution is not easy to apply when the sales division and the engineering division are managed by two distinct role administrators, as often happens. Moreover, it allows the user to have only the permissions authorized for the sales role or only the permissions authorized for the engineering role, but not permissions authorized for both. This solution is thus limited.

Another known solution is to create a managed role "cn=ManagedEngRole" possessing the user-oriented entry "cn=bob" and a nested role that contains both the sales role 132 and the role possessing the user "cn=bob". This requires the new nested role entry to be located at the top level of the directory tree structure, which is extremely complicated to administer.

Embodiments of the present invention address the above problem. Embodiments of the present invention implement a new method for extending role scope.

Embodiments in accordance with the present invention propose to extend the scope of role entries based on extra data. In accordance with embodiments of the present invention, the extra data identify an extra scope of the DIT and may be added to role entries to extend their scope. The extra data are enabled in the LDAP metadata.

According to an aspect of the invention, the extra data may comprise a special attribute nsRoleScopeDN that identifies the extra scope.

For each one of these roles, if the corresponding role entry does not comprise the special attribute nsRoleScopeDN, the scope of the role is the scope defined by the LDAPsubentry object class, in accordance with the prior art.

On the other hand, if the corresponding role entry comprises the special attribute nsRoleScopeDN, the scope of the role entry is the union of the scope defined through the LDAPsubentry object class and the extra scope indicated by the special attribute. Thus, a user entry or a group of user entries, who are members of a given role, can have an extra scope that is different from the scope of the given role.

Consequently, a user can benefit from a permission restricted to a particular role, even if he/she is not in the organization for which the role is defined.

Figure 10:
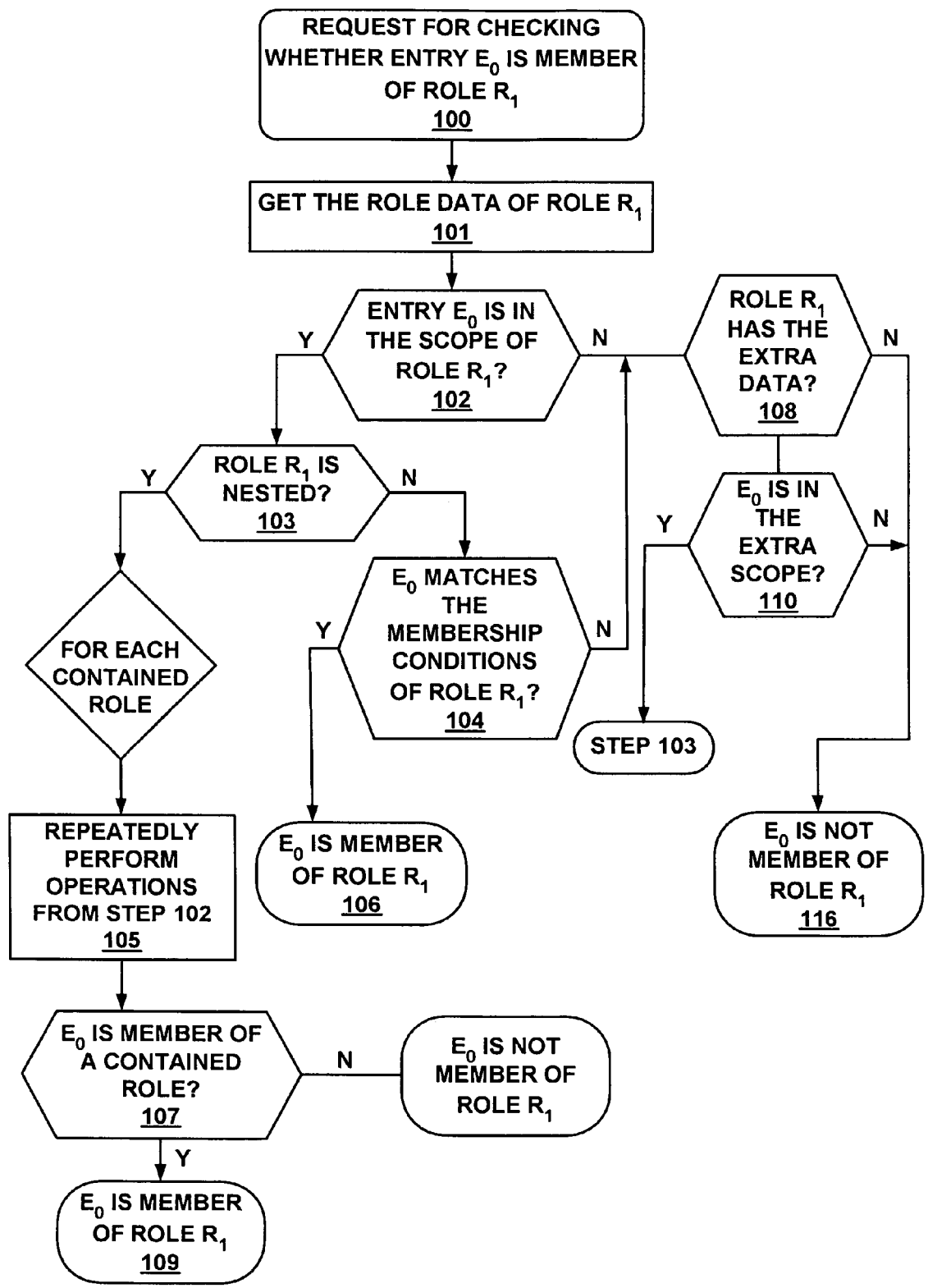
FIG. 10 is a general flowchart for determining whether a given entry is a member of an existing role, in accordance with an embodiment of this invention.

Reference is now made to FIG. 10, illustrating the different operations performed for checking whether a given user entry E0 is a member of a given role R1, according to an embodiment of the invention. As in the prior art, the directory tree comprises role entries. However, in accordance with embodiments of the invention, some of the role entries may comprise the special attribute nsRoleScopeDN.

At the initial operation 100, the directory server receives the request. Operation 101 retrieves role data associated with role R1. These role data are represented by a data structure comprising specific information about the role, like the type of the role, e.g., "nested", the filter condition when the role is filtered and the role distinguished name dn. The role data may be stored in a cache to ease the processing of the request. They are provided from the attributes comprised in the role definition entry.

Operation 102 determines if entry E0 is in the scope of role R1. This operation may be performed by comparing part of the distinguished names of entry E1 and role R1.

If entry E0 is in the scope of role R1, operation 103 further checks whether role R1 is nested.

If role R1 is not nested, the server tests, at operation 104, if entry E0 matches the membership condition of role R1
- If role R1 is filtered, the membership condition corresponds to the filter condition as is provided by the role data;
- If role R1 is managed, the membership condition is related to the role dn provided by the role data, If entry E0 matches the membership condition of role R1, operation 106 determines that entry E0 is a member of role R1.

If role R1 is nested, at operation 105, the directory server recursively performs operations 102 and 104 for each role contained by the nested role. Therefore, the membership condition that is tested in those steps corresponds to the membership conditions of the roles contained by the nested role.

If entry E0 is in the role scope of one of the roles contained by role R1 and if entry E0 matches the membership condition of that role, i.e. if entry E0 is a member of one the role contained by role R1 (test 107), operation 109 determines that entry E0 is a member of role R1.

At operation 102, if entry E0 is not in the scope of role R1, operation 108 determines whether role R1 has the special attribute nsRoleScopeDN. If not, operation 116 determines that entry E0 is not a member of role R1.

If role R1 has the special attribute nsRoleScopeDN, this special attribute identifying an extra scope, operation 110 checks if entry E0 is in the extra scope, and if so, operation 103, described above, is performed.

In accordance with this embodiment of this invention, the special attribute nsRoleScopeDN designates the Distinguished Name of the extra scope.

According to an alternative embodiment of this invention, in addition to the extra scope, the extra data of a given role may identify an appended role being out of the scope of the role.

The extra scope is thus a scope of the tree structure that includes the scope of the role being appended. The extra scope may be, for example, the scope of the appended role. In particular, the extra data may comprise the special attribute identifying the extra scope and another attribute identifying the appended role.

According to this embodiment of the invention, the directory server enables an entry or a set of entries being in an extra scope to be a member of a role, if the following conditions are fulfilled:
- the entry or set of entries is/are a member of an appended role;
- the role has the extra data;
- the appended role and the extra scope are identified by the extra data of the role.

It is not required that the entry or set of entries belong to the scope of the role entry, in contrast to the prior art.

With reference to FIG. 9, e.g., the entry "cn=rob" belonging to the appended role "cn=engrole" could be a member of the role "cn=salesrole", if the role entry "cn=salesrole" is added the extra data and if the extra data identify the appended role "cn=engrole" and an extra scope including the scope 1300.

In accordance with this embodiment, the special attribute, called nsRoleScopeDN is attached to nested roles and designates the DN of a location in the tree, the extra scope being the subtree of this location.

Nested role entries are provided by an embodiment of the present invention to contain one or more roles of any type, these roles being in the scope of the nested role entry. The attribute nsRoleDN of the nested role defines the distinguished name dn of the contained roles. The structure of nested roles has been, improved to also enable an appended role that is out of the scope of a nested role entry to be contained by the nested role entry, and, as a result, to enable a group of entries out of the scope of the nested role to be a member of the nested role. To perform such an extension, the value of the nsRoleScopeDN attribute designates the location of an extra scope that includes the appended role scope, and a value of the nsRoleDN attribute identifies the appended role.

Consequently, the directory server may use the nsRoleDN attribute designating the DN of an appended role and the nsRoleScopeDN attribute designating an extra scope to enable an entry possessing the designated appended role to further possess the nested role.

The table of FIG. 11 illustrates the structure of a nested role having an extending scope. A nested role entry according to the prior art is identified by the attribute dn, and belongs to the object classes LDAPsubentry, nsRoleDefinition, nsComplexRoleDefinition and nsNestedRoleDefinition. Moreover, a role contained by the nested role is identified by the attribute nsRoleDn. According to the prior art, the values of this attribute designate the distinguished names (dn) of the contained roles. The syntax of these distinguished names may directly give information about the scope of the contained roles. According to an aspect of the invention, the distinguished names of the contained roles may indicate that their scope is different from the scope of the nested role.

The scope extension of nested roles is made possible by the nsRoleScopeDn attribute. This attribute is defined in LDAP schema, and may be associated with the nsNesledRoleDefinition object class. Consequently, any nested role entry of the directory tree may have added to it the nsRoleScopeDn attribute. The syntax of this attribute is a distinguished name syntax.

Additionally, the role data associated with nested roles may comprise the extra scope or extended scope designated by nsRoleScopeDN. The extended scope may be updated in the role data, in response to the nsRoleScopeDN attribute being modified, added or deleted.

Figure 12:
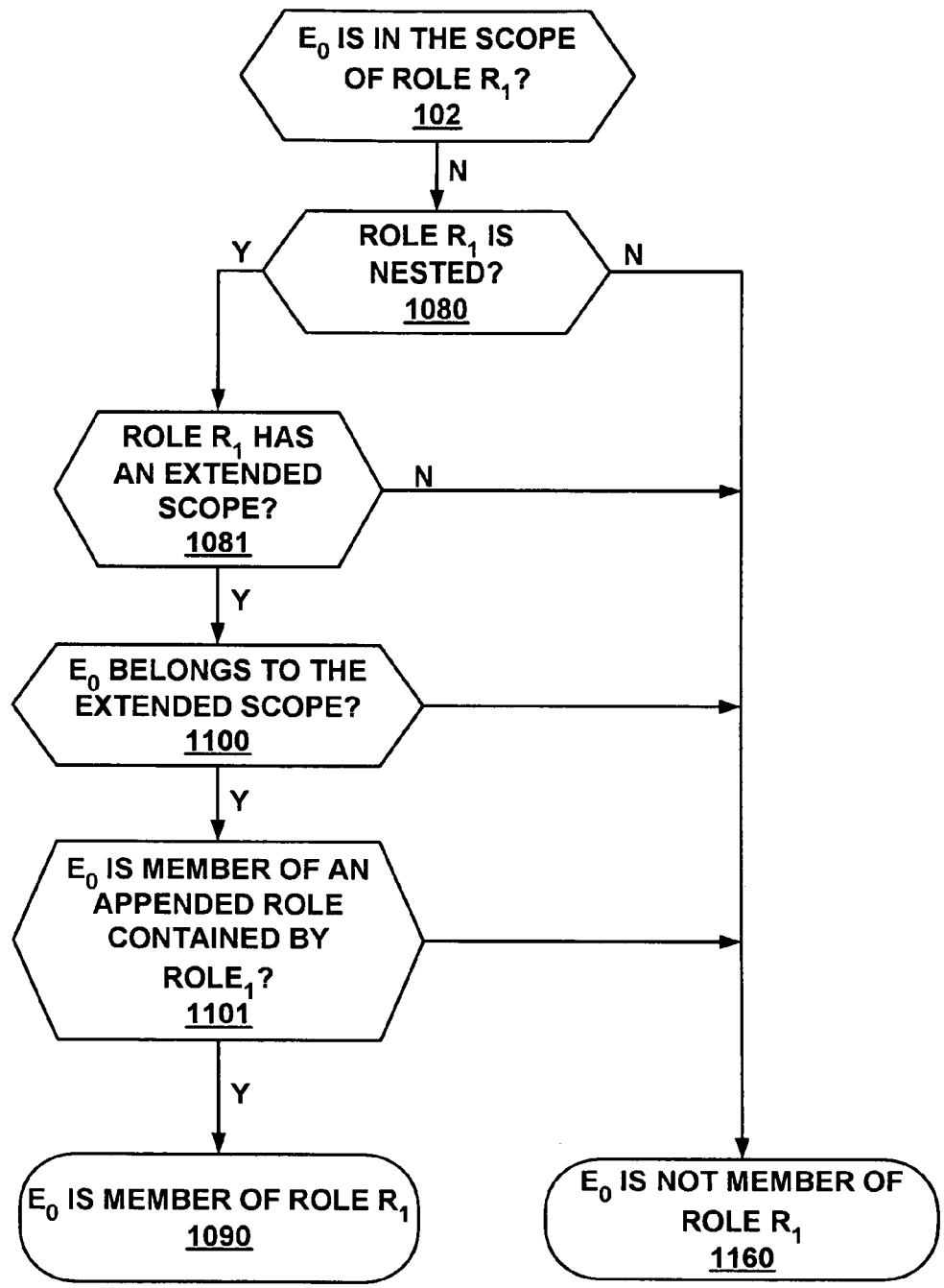
FIG. 12 is a flowchart for determining whether a given entry is a member of an existing role, in accordance with an alternative embodiment of this invention.

FIG. 12 is a flowchart showing alternatives to operations 108 and 110 of FIG. 10, according to an embodiment in accordance with the present invention.

If operation 102 of FIG. 10 determines that entry E0 is not in the scope of role R1, operation 1080 of FIG. 12 checks whether role R1 is nested. If role R1 is nested, operation 1081 determines if role R1 further has an extended scope based on the role data and if so, operation 1100 determines whether entry E0 is in the extended scope. In response to entry E0 being in the extending scope, operation 1101 determine whether entry E0 is a member of an appended role contained by the nested role. This operation may be performed by determining whether entry E0 is a member of one of the roles contained by nested role R1, according to operations 105 and 107 of FIG. 10. If test 1101 succeeds, operation 1090 determines that entry E0 is a member of role R1. If one of the previous tests fails, operations 1160 determines that entry E0 is not a member of role R1.

Alternatively, it is possible that several appended roles may be contained by a nested role, provided that all those appended roles are in the extra scope An important function related to roles is to enumerate all the roles possessed by a user. The concept of extending scope for roles involves modifications to that function. An embodiment in accordance with the present invention based on nested roles makes it possible to use parts of the existing operations used for enumerating the roles possessed by a user.

Figure 13A:
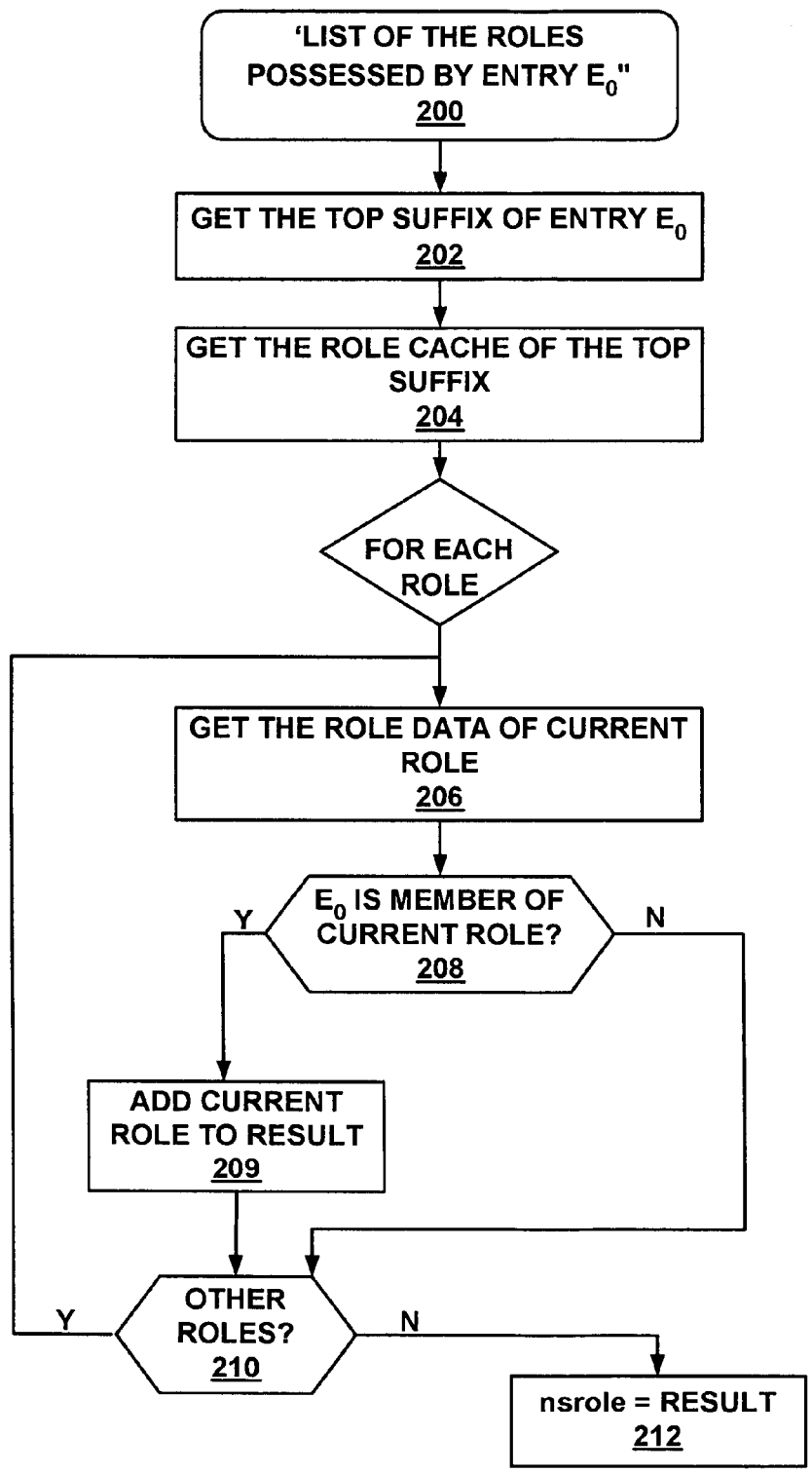
FIG. 13a is a flowchart for enumerating the roles of a given entry according to the prior art.
Figure 13B:
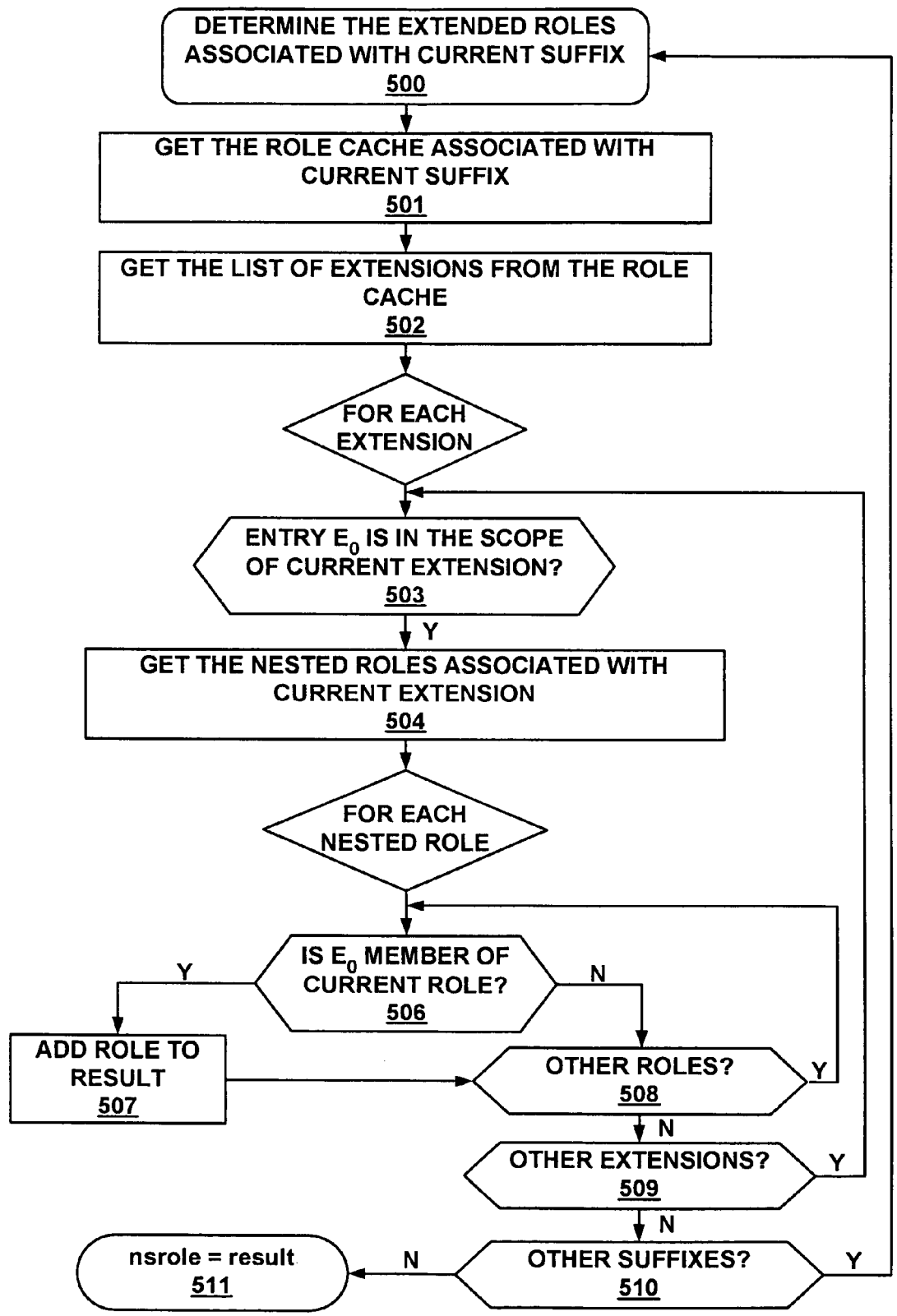
FIG. 13b is a flowchart for enumerating the roles of a given entry according to an embodiment of the present invention.

FIG. 13a is a flowchart representing the different operations implemented to perform such a function according to the prior art. FIG. 13b is a flowchart representing different operations implemented to perform such a function according to an embodiment of the present invention.

In the prior art, when a request is made to determine the roles possessed by a given user entry, the set of candidate roles is determined from a list of roles associated with the top suffix of the given entry. This list is prepared in advance in a role cache. The role cache is a data structure updated on creating a new role or on deleting an existing role in the subtree of the top suffix. The role cache contains the list of the roles defined in the subtree of the top suffix. Each role of the role cache is also related to the role data.

The existing function for computing nsrole is based on testing whether the given entry is a member of a set of candidate roles. For each one of the candidate roles, the directory server tests if the given entry E0 is a member of that role.

FIG. 13a illustrates the processing of a request for listing the roles possessed by a given user entry E0 at operation 200, the directory server receives the request for listing the roles possessed by a given user entry E0. In response to the request for enumerating all the roles possessed by a given user entry E0, in operation 200, the directory server proceeds to the computing of nsrole attribute for that entry. The nsrole attribute is a multi-valued attribute indicating all the roles possessed by a user entry.

the computing of nsrole attribute starts with operation 202, that performs access to the top suffix of entry E0;

operation 204 retrieves the role cache associated with the top suffix of E;

for each role of the cache role, operation 206 retrieves the role data of the current role;

operation 208 tests if entry E0 is a member of the current role, and if so adds the role to the result and select the next role of the list;

when all the candidate roles have been tested (operation 210 fails), the directory server assigns the result to nsrole, at operation 212.

FIG. 13b will be discussed below, after a discussion of FIG. 14. According to another aspect of the present invention, the directory tree structure may comprise extended roles i.e., roles having extended scope. Consequently, a given entry E0 may be a member either of one of the roles associated with its top suffix, or of one of the roles of another top suffix.

Figure 14:
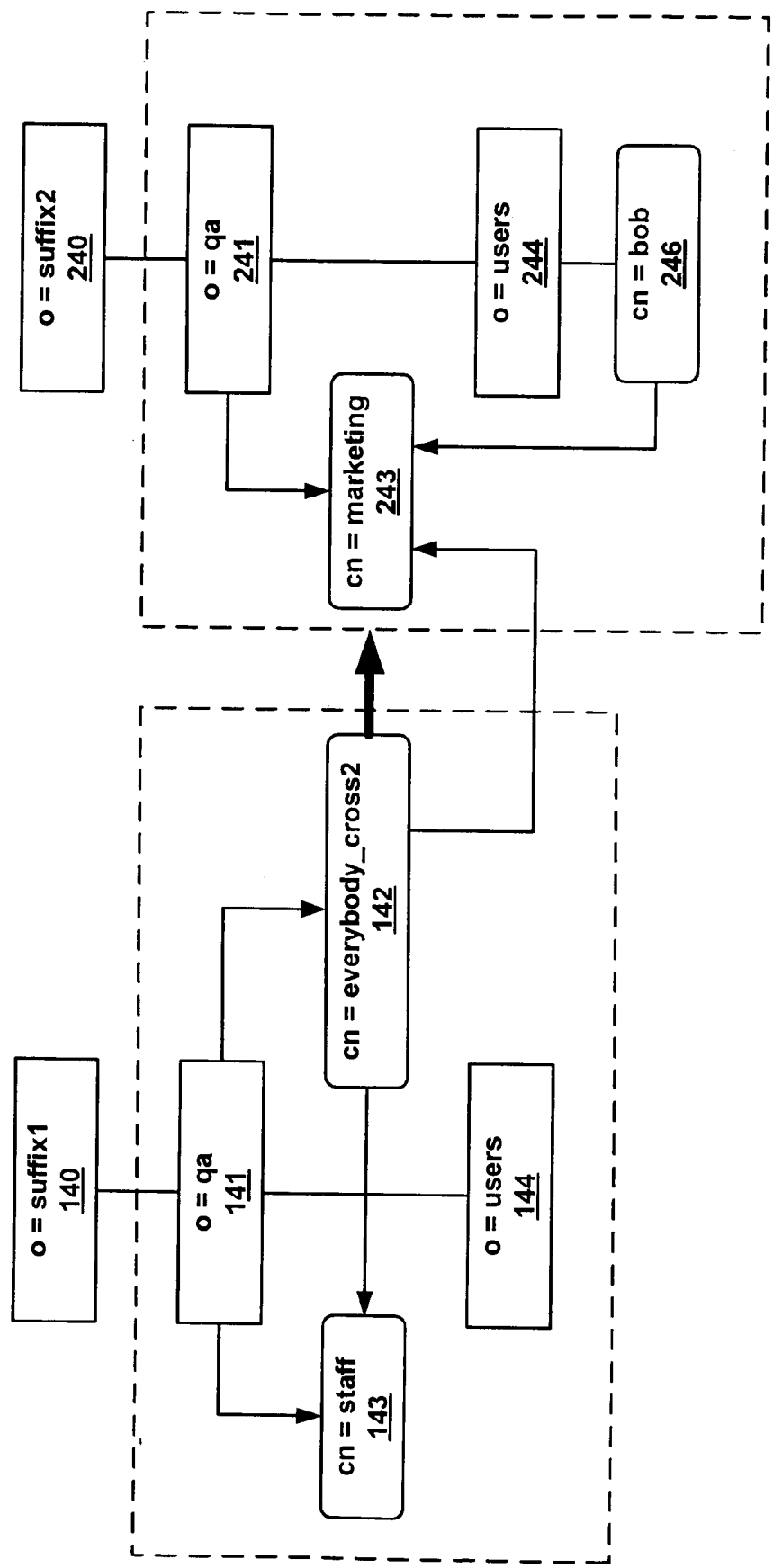
FIG. 14 represents portions of an LDAP tree comprising extending roles in accordance with an embodiment of the present invention.

FIG. 14 illustrates parts of a directory tree structure, comprising an extended role. Table VI comprises the definition of this structure in LDIF, according to an embodiment of the present invention.

TABLE VI suffix definition 1
dn : o=suffix_1
objectclass : organization
objectclass : top
organization entry
dn : o=qa,o=suffix_1
objectclass : organization
objectclass : top
user organization unit entry
dn : ou=users,o=qa,o=suffix_1
objectclass : organizationalUnit
objectclass : top
extended role entry
dn : cn=everybody_cross2,o=qa,o=suffix_1
objectclass : LDAPsubentry
objectclass : nsRoleDefinition
objectclass : nsComplexRoleDefinition
objectclass : nsNestedRoleDefinition
nsRoleScopeDN : o=suffix_2
nsroledn : cn=marketing,o=qa,o=suffix_2
nsroledn : cn=staff,o=qa,o=suffix_1
staff role
dn : cn=staff,o=qa,o=suffix_1
objectclass: LDAPsubentry
objectclass: nsRoleDefinition
objectclass: nsSimpleRoleDefinition
objectclass: nsManagedRoleDefinition
suffix definition 2
dn : o=suffix_2
objectclass : organization
objectclass : top
organization entry
dn : o=qa,o=suffix_2
objectclass : organization
objectclass : top
user organization unit entry
dn : ou=users,o=qa,o=suffix_2
objectclass : organizationalUnit
objectclass : top
marketing role
dn : cn=marketing,o=qa,o=suffix_2
objectclass : LDAPsubentry
objectclass : nsRoleDefinition
objectclass: nsSimpleRoleDefinition
objectclass: nsManagedRoleDefinition
user entry
dn : cn=bob,ou=users,o=qa,o=suffix_2
objectclass : top
objectclass : person
sn : kap
userpassword: secret
nsroledn : cn=marketing,o=qa,o=suffix_2
© 2002, SUN Microsystems ™

In the prior art, to find all the roles possessed by the given entry 246 "cn=bob,o=user,o=qa,o=suffix2", the directory server tests the candidates roles of its top suffix "o=suffix2". This test indicates that entry 246 is a member of the role 243, "cn=marketing". But, the entry 246 is also a member of an extended role 142 "cn=everybody_cross2" under another top suffix 140 "o=suffix1", which is not found by the function of the prior art.

Embodiments of the invention propose to modify the selection of the candidate roles in order to further find the extended roles possessed by a given entry.

For each top suffix of the directory tree structure, for each role of the role cache associated with that suffix, the directory server may test if entry E0 is a member of that role according to the operations of the FIG. 10 or 12. However, as a directory tree structure may comprise a great number of role entries, this may not be optimum.

Alternatively, the following operations may be performed:
- a1) executing the function for listing all the role possessed by entry E0, according to the prior art, as illustrated in FIG. 13*a*. This operation provides the roles possessed by entry E0, among the roles associated with its top suffix, these roles not being extended;
- b1) for each top suffix of the directory tree structure, testing if entry E0 is a member of one of the extended roles among the candidates roles of that suffix, according to the flowchart of FIGS. 10 and 12.

An embodiment of operation b1) is illustrated by the flowchart of FIG. 13*b*, in accordance with an embodiment of the present invention. To determine the extended roles associated with a top suffix of the tree structure (request 500), operation 500 retrieves the role cache of the current top suffix. In accordance with an aspect of this embodiment, the role cache further comprises a field indicating the list of extensions of the top suffix, the extensions representing the distinguished names of the extended scopes defined in nested roles under the top suffix. This list is prepared in advance from the role data of those nested roles.

After retrieving the list of extensions (operation 502), operation 503 determines, for each extension, whether the given entry E0 is in the scope defined by the extension. This may be done by comparing the distinguished name of the entry with the distinguished name of the extension.

If entry E0 is in the scope defined by the extension, operation 504 gets the nested roles associated with the current extension. Operation 506 then tests if entry E0 is a member of each one of these roles, according to the operations of the flowchart represented in FIG. 10 or 12. When entry E0 is determined to be a member of a role, the role is added to the result-(operation 507).

After checking all the roles associated with the current extension (operation 508), the directory server recursively repeats operations 503 to 508 for all the extensions. When all the extensions have been checked (test 509), the directory server repeats operations 501 to 509 for the next top suffix of the tree structure. When all the suffixes have been checked (test 510), the directory server assigns the result to the nsrole attribute of entry E0 (operation 511).

Figure 15A:
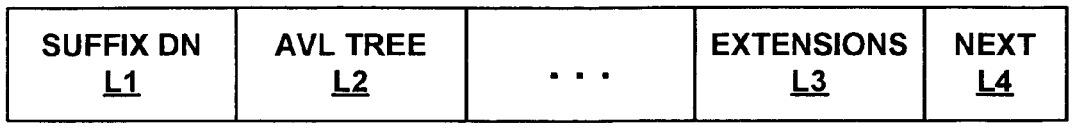
FIG. 15a, FIG. 15b, FIG. 15c, FIG. 16, FIG. 17, FIG. 18a, FIG. 18b, and FIG. 18c represent the structure of role caches associated with top suffixes according to embodiments of the invention.
Figure 15B:
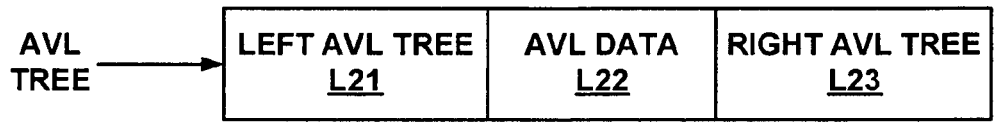
Figure 15C:
Figure 16:
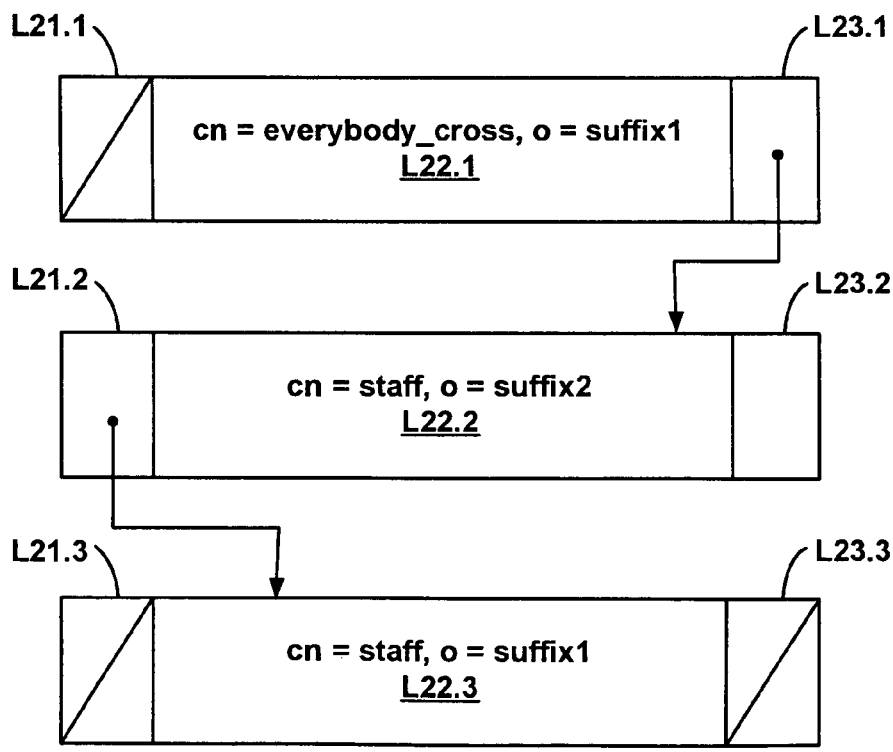

Reference is now made to FIGS. 15*a* to 15*c*, showing an exemplary structure of a role cache. This structure known in the art, has been modified to enable the extension of role scope. A role cache maintains the following information for a given top suffix, as shown in FIG. 15*a*:
- the DN of the top suffix in field L1,
- the list of the roles associated with that top suffix in field L2, In accordance with an aspect of this invention, the role cache also provides a pointer L3 to the list of the top suffix extensions, defined in nested roles under this given top suffix. This pointer indicates the DN of an extension L31 of the top suffix and a pointer L32 to the next extension.

More specifically, the list of the roles may be represented with binary search trees, such as AVL trees (named after their inventors Adelson-Velskii-Landis). The structure of FIG. 15*a* illustrates the structure of an AVL tree. An AVL tree representing a role comprises a pointer to the root of the AVL tree, in field L2.

Each role is represented by an AVL tree. An AVL node of an AVL tree may be represented by the structure of FIG. 15*b*, comprising a pointer on the left AVL node L21, a pointer on the right AVL node L23, and AVL data L22 corresponding to the role data. When the role is nested, the right or the left AVL node represents the distinguished names of the roles contained by the nested role.

FIG. 15*c* illustrates extensions comprising: Extension DN L31 and Next Extension L32.

Figures 17, 18A, 18B, 18C:
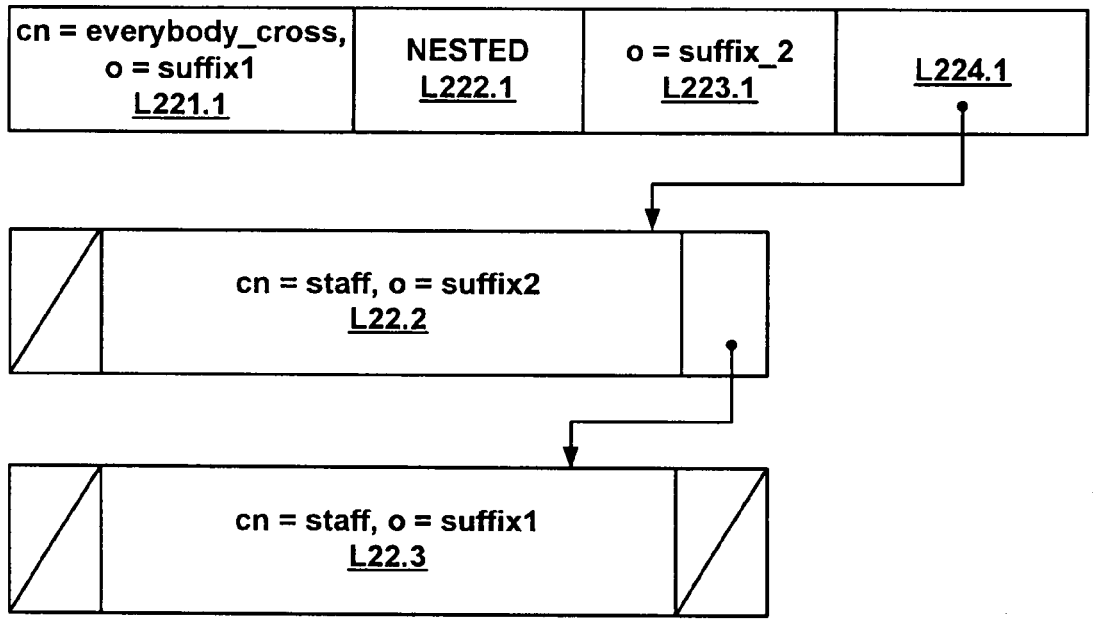

Referring to FIG. 17, the AVL data represent the role data. In particular, they comprise the following information:
- the distinguished name of the role entry L221,
- the role type L222 (nested/managed/filtered).

If the role is filtered, the AVL data further comprise the filter condition defined by the role filter.

According to another aspect of the invention, the AVL data may comprise the DN of the extended scope in field L223. This information is related to the value of nsRoleScopeDN attribute in the role entry and correspond to one of the extension of the suffix.

FIGS. 16 and 18*a* to 18*c* illustrate an example of a role cache of an extended role, in accordance with embodiments of the present invention. The field L2 of the role cache of root suffix "o=suffix1" is a pointer on the AVL tree represented in FIG. 16.

The AVL node representing the role "cn=everybody_cross,o=suffix1" of field L22.1, has a pointer 123.1 on the AVL tree a first contained role 122.2 "cn=staff, o=qa,o=suffix_2".

Moreover, the AVL node representing this first contained role, has a pointer 121.2 on the AVL tree of a second contained role L22.3 "cn=staff, o=qa,o=suffix_1".

Reference is now made to FIGS. 18*a* to 18*c*, representing the AVL data of the roles L22.1, L22.2 and L22.3, in accordance with embodiments of the present invention. The field L222.1 of FIG. 18*a* indicates that the role L22.1 "cn=everybody_cross, o=suffix 1" is nested. The AVL data of that role also comprise the field L223 comprising a distinguished name indicating an extended scope. The extension of the scope of the role L22.1 is performed using the information contained in fields L22.2 and L223.

FIGS. 18*b* and 18*c* represent the AVL data of the roles contained by the role "everybody_cross, o=suffix1", in accordance with embodiments of the present invention. The field L221.2 of FIG. 18*b* indicates that the role having the DN "cn=staff,o=qa,o=suffix2" stored in field L221.2 is managed. The field L221.3 of FIG. 18*c* indicates that the role having the DN "cn=staff,o=qa,o=suffix12" stored in field L221.2 is also managed.

In accordance with embodiments of the present invention, on attaching the nsRoleScopeDN to a nested role, the directory server proceeds to the following update operations:
- i1) updating the field L223 "scope extension DN" in the role data associated with the nested role;
- ii1) updating the field L22 "extensions" L31 in the role cache of the nested role suffix.

In accordance with another embodiment of this invention, it is possible to enable a single user in a first scope to be a member of a nested role having a second scope, the first scope and the second scope being different. This function is performed by the following operations:

i2) creating an appended role, preferably a managed role, that only possesses the single user;

ii2) adding the attribute nsRoleScopeDN, invoking the extra scope and the attribute nsRoleDN, invoking the dn of the appended role to selected nested roles of the tree structure, in order to enable the single user to be a member of those roles.

Figure 19:
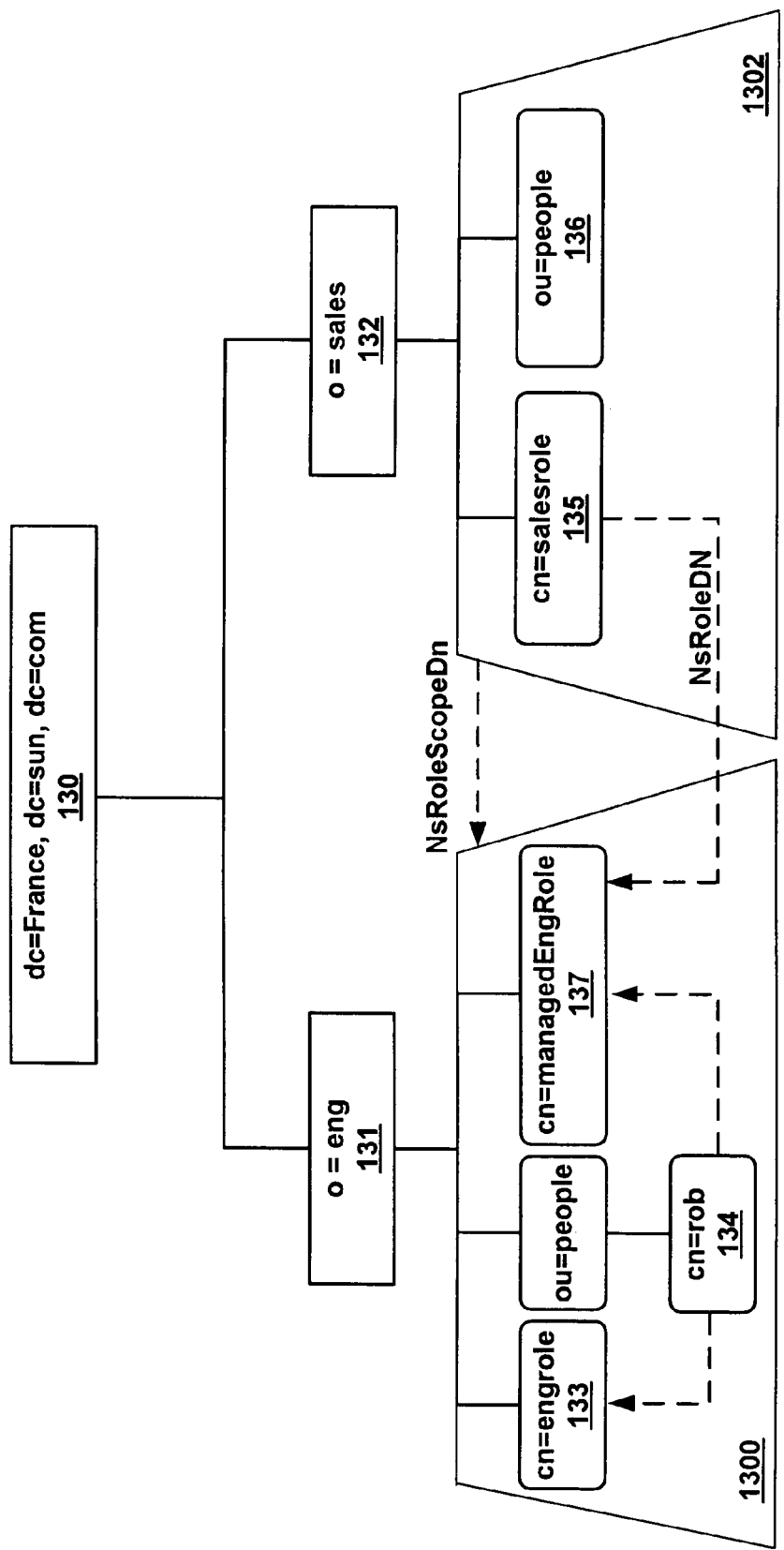
FIG. 19 shows a tree structure portion having an extending role.

Referring now to FIG. 9, many users, not represented, may be a member of the role "cn=engrole". To enable the single user "cn=rob" of the suffix 134 "o=eng" to be a member of the role 135 "cn=salesrole", according to operation i2), a managed role 137 "cn=managedEngRole" has been created, according to an embodiment of the present invention. The corresponding structure is represented in FIG. 19. According to operation ii2), the role 135 "cn=salesrole" is added according to an embodiment of the present invention:

the attribute nsRoleScopeDN, invoking the distinguished name of the extra scope;

the attribute nsRoleDN, invoking the distinguished name of the role managedEngRole "o=eng,dc=France, dc=sun,dc=com".

In the prior art, the enumeration of the entries possessed by a given role is performed by computing the nsrole attribute of candidate entries. The operations for computing nsrole attribute according to embodiments of the invention, have been described in reference to FIG. 13a.

Embodiments in accordance with the invention also encompass software code, especially when made available on any appropriate computer-readable medium. The expression "computer-readable medium" includes a storage medium such as magnetic or optic, as well as a transmission medium such as a digital or analog signal. Such software code may include data and/or metadata.

This invention also encompasses the software code to be added to existing directory server functionalities to perform anyone of the various new functionalities, as described above, which may be used independently of each other.

On another hand, a number of features have been positively described, using absolute language, to help understanding the LDAP example. Each such feature should be considered as exemplary only, and is not intended to restrict the scope of this invention in any way.

The preferred embodiment of the present invention, extending role scope in a distributed computer system, is thus described. While the present invention has been described in particular embodiments, it should be appreciated that the present invention should not be construed as limited by such embodiments, but rather construed according to the below claims.

What is claimed is:

1. A method of extending role scope in a directory server system comprising:

obtaining an updated tree structure comprising an extra scope by:

a) associating an existing role entry in a tree structure with a first user entry in the tree structure, wherein a directory server interacts with entries in the tree structure, and wherein the existing role entry defines a role and has an associated scope in the tree structure based on the existing role entry's location in the tree structure according to a first predefined rule, said associating comprising attaching the role to the first user entry subject to a first condition comprising a role membership condition and the first user entry belonging to the associated scope, b) adding an attribute to the existing role entry having a special attribute name and being associated with an attribute value defining the extra scope in the tree structure for the existing role entry, wherein the attribute value identifies a designated location in the tree structure outside the existing role entry's associated scope, and further wherein the extra scope is based on the designated location according to a second predefined rule, and c) attaching the role of the existing role entry to a second user entry subject to a second condition comprising said role membership condition and the second user entry belonging to the extra scope; and performing a role operation associated with the updated tree structure in response to a request, wherein the role operation identifies that the second user entry possesses the role.

2. The method of claim 1, wherein the existing role entry is a nested role entry defining at least one other role.

3. The method of claim 2, wherein the existing role entry has an attribute defining the at least one other role.

4. The method of claim 1, wherein the role membership condition comprises a candidate user entry having an attribute designating the role defined by the existing role entry.

5. The method of claim 1, wherein the existing role entry has a role filter condition, and the role membership condition comprises one or more attributes of a candidate user entry meeting the role filter condition.

6. The method of claim 5, wherein the existing role entry has an attribute designating the role filter condition.

7. The method of claim 1, wherein the extra scope is defined as a subtree of the designated location.

8. The method of claim 1, wherein the first predefined rule comprises defining the existing role entry's associated scope as a subtree of a parent of the existing role entry in the tree structure.

9. The method of claim 1, wherein the request comprises a request of whether a designated user entry has a given role, and wherein performing the role operation comprises:

d1) identifying a corresponding role entry corresponding to the given role;

d2) determining whether the designated user entry meets the first condition in relation to the corresponding role entry;

d3) if the designated user entry does not meet the first condition in relation to the corresponding role entry, determining whether the corresponding role entry has extra role data identifying an extra scope; and d4) if the corresponding role entry has extra role data, determining whether the designated user entry meets the second condition in relation to the corresponding role entry.

10. The method of claim 1, wherein the request comprises a request for any user entries having a given role, and wherein performing the role operation comprises:

d1) identifying a corresponding role entry corresponding to the given role;

d2) scanning the tree to identify any user entries meeting the first condition in relation to the corresponding role entry; and d3) if the corresponding role entry has extra role data identifying an extra scope, scanning the tree to identify any user entries meeting the second condition in relation to the corresponding role entry.

11. The method of claim 1, wherein the request comprises a request for roles of a given user entry, and wherein performing the role operation comprises:
   d1) identifying a candidate role entry;
   d2) determining whether the given user entry meets the first condition in relation to the candidate role entry;
   d3) if the given user entry does not meet the first condition in relation to the candidate role entry and the candidate role entry has extra role data identifying an extra scope, determining whether the given user entry meets the second condition in relation to the candidate role entry; and
   d4) repeating said d1) through said d3) with other candidate role entries until an end condition is met.

12. The method of claim 11, wherein the end condition comprises having performed said d1) through said d3) with substantially all the applicable candidate role entries.

13. The method of claim 11, wherein the given user entry belongs to a subtree of a top suffix of the tree structure, said d2) is performed for each role entry belonging to the subtree of said top suffix, and said d3) is performed for each role entry belonging to any subtree of any top suffix of the tree structure.

14. A directory server system comprising:
   a directory server that interacts with entries in a tree structure, said tree structure comprising an existing role entry and a first user entry, wherein the existing role entry defines a role and has an associated scope in the tree structure based on the existing role entry's location in the tree structure according to a first predefined rule; and
   a role mechanism that obtains an updated tree structure comprising an extra scope by:
      attaching the existing role entry's role to the first user entry subject to a first condition comprising a role membership condition and the first user entry belonging to the associated scope, and
      attaching the existing role entry's role to a second user entry subject to a second condition comprising said role membership condition and the second user entry belonging to an extra scope identified by extra role data of the existing role entry, wherein the extra role data comprise an added attribute having a special attribute name and being associated with an attribute value identifying a designated location in the tree structure outside of the existing role entry's associated scope, and the extra scope is based on the designated location according to a second predefined rule,
   wherein the directory server performs a role operation associated with the updated tree structure in response to a request, wherein the role operation identifies that the second user entry possesses the role.

15. The directory server system of claim 14, wherein the existing role entry is a nested role entry defining at least one other role.

16. The directory server system of claim 15, wherein the existing role entry has an attribute defining the at least one other role.

17. The directory server system of claim 14, wherein the role membership condition comprises a candidate user entry having an attribute designating the role defined by the existing role entry.

18. The directory server system of claim 14, wherein the existing role entry has a role filter condition, and the role membership condition comprises one or more attributes of a candidate user entry meeting the role filter condition.

19. The directory server system of claim 18, wherein the existing role entry has an attribute designating the role filter condition.

20. The directory server system of claim 14, wherein the extra scope is defined as a subtree of the designated location.

21. The directory server system of claim 14, wherein the first predefined rule comprises defining the existing role entry's associated scope as a subtree of a parent of the existing role entry in the tree structure.

22. The directory server system of claim 14, wherein the request comprises a request of whether a designated user entry has a given role, and wherein performing the role operation comprises:
   i) identifying a corresponding role entry corresponding to the given role;
   ii) determining whether the designated user entry meets the first condition in relation to the corresponding role entry;
   iii) if the designated user entry does not meet the first condition in relation to the corresponding role entry, determining whether the corresponding role entry has extra role data defining an extra scope; and
   iv) if the corresponding role entry has extra role data, determining whether the designated user entry meets the second condition in relation to the corresponding role entry.

23. The directory server system of claim 14, wherein the request comprises a request for any user entries having a given role, and wherein performing the role operation comprises:
   i) identifying a corresponding role entry corresponding to the given role;
   ii) scanning the tree to identify any user entries meeting the first condition in relation to the corresponding role entry; and
   iii) if the corresponding role entry has extra data identifying an extra scope, scanning the tree to identify any user entries meeting the second condition in relation to the corresponding role entry.

24. The directory server system of claim 14, wherein the request comprises a request for roles of a given user entry, and wherein performing the role operation comprises:
   i) identifying a candidate role entry;
   ii) determining whether the given user entry meets the first condition in relation to the candidate role entry;
   iii) if the given user entry does not meet the first condition in relation to the candidate role entry and the determined role entry has extra data identifying an extra scope, determining whether the given user entry meets the second condition in relation to the candidate role entry; and
   iv) repeating said i) through said iii) with other candidate roles entries until an end condition is met.

25. The directory server system of claim 24, wherein the end condition comprises having performed said i) through said iii) with substantially all the applicable candidate role entries.

26. The directory server system of claim 24, wherein the given user entry belongs to a subtree of a top suffix of the tree structure, said ii) is performed for each role entry belonging to the subtree of said top suffix, and said iii) is performed for each role entry belonging to any subtree of any top suffix of the tree structure.

27. A computer readable storage medium comprising software code stored thereon for:
  obtaining an updated tree structure comprising an extra scope by:
    a) associating an existing role entry in a tree structure with a first user entry in the tree structure, wherein a directory server interacts with entries in the tree structure, and wherein the existing role entry defines a role and has an associated scope in the tree structure based on the existing role entry's location in the tree structure according to a first predefined rule, said associating comprising attaching the role to the first user entry subject to a first condition comprising a role membership condition and the first user entry belonging to the associated scope,
    b) adding an attribute to the existing role entry having a special attribute name and being associated with an attribute value defining the extra scope in the tree structure for the existing role entry, wherein the attribute value identifies a designated location in the tree structure outside the existing role entry's associated scope, and further wherein the extra scope is based on the designated location according to a second predefined rule, and
    c) attaching the role of the existing role entry to a second user entry subject to a second condition comprising said role membership condition and the second user entry belonging to the extra scope; and
  performing a role operation associated with the updated tree structure in response to a request, wherein the role operation identifies that the second user entry possesses the role.

28. The computer readable storage medium of claim 27, wherein the existing role entry is a nested role entry defining at least one other role.

29. The computer readable storage medium of claim 28, wherein the existing role entry has an attribute defining the at least one other role.

30. The computer readable storage medium of claim 27, wherein the role membership condition comprises a candidate user entry having an attribute designating the role defined by the existing role entry.

31. The computer readable storage medium of claim 27, wherein the existing role entry has a role filter condition, and the role membership condition comprises one or more attributes of a candidate user entry meeting the role filter condition.

32. The computer readable storage medium of claim 31, wherein the existing role entry has an attribute designating the role filter condition.

33. The computer readable storage medium of claim 27, wherein the extra scope is defined as a subtree of the designated location.

34. The computer readable storage medium of claim 27, wherein the first predefined rule comprises defining the existing role entry's associated scope as a subtree of a parent of the existing role entry in the tree structure.

35. The computer readable storage medium of claim 27, wherein the request comprises
  a request of whether a designated user entry has a given role, and wherein performing the role operation comprises:
    d1) identifying a corresponding role entry corresponding to the given role;
    d2) determining whether the designated user entry meets the first condition in relation to the corresponding role entry;
    d3) if the designated userentry does not meet the first condition in relation to the corresponding role entry, determining whether the corresponding role entry has extra role data identifying an extra scope; and
    d4) if the corresponding role entry has extra role data, determining whether the designated user entry meets the second condition in relation to the corresponding role entry.

36. The computer readable storage medium of claim 27, wherein the request comprises
  a request for any user entries having a given role, and wherein performing the role operation comprises:
    d1) identifying a corresponding role entry corresponding to the given role;
    d2) scanning the tree to identify any user entries meeting the first condition in relation to the corresponding role entry; and
    d3) if the corresponding role entry has extra role data identifying an extra scope, scanning the tree to identify any user entries meeting the second condition in relation to the corresponding role entry.

37. The computer readable storage medium of claim 27, wherein the request comprises
  a request for roles of a given user entry, and wherein performing the role operation comprises:
    d1) identifying a candidate role entry;
    d2) determining whether the given user entry meets the first condition in relation to the candidate role entry;
    d3) if the given user entry does not meet the first condition in relation to the candidate role entry and the candidate role entry has extra role data identifying an extra scope, determining whether the given user entry meets the second condition in relation to the candidate role entry; and
    d4) repeating said d1) through said d3) with other candidate role entries until an end condition is met.

38. The computer readable storage medium of claim 37, wherein the end condition comprises having performed said d1) through said d3) with substantially all the applicable candidate role entries.

39. The computer readable storage medium of claim 37, wherein the given user entry belongs to a subtree of a top suffix of the tree structure, said d2) is performed for each role entry belonging to the subtree of said top suffix, and said d3) is performed for each role entry belonging to any subtree of any top suffix of the tree structure.

* * * * *